United States Patent [19]
Hajek et al.

[11] Patent Number: 5,116,636
[45] Date of Patent: May 26, 1992

[54] METHOD FOR STEAM CLEANING AND ELECTROSTATIC COATING OF LAMINATED ARTICLES

[75] Inventors: Bedrich Hajek, New Haven; Donald J. Gillette, Guilford, both of Conn.

[73] Assignee: S.L. Electrostatic Technology, Inc., Branford, Conn.

[21] Appl. No.: 743,098

[22] Filed: Aug. 9, 1991

Related U.S. Application Data

[62] Division of Ser. No. 493,791, Mar. 15, 1990, Pat. No. 5,052,332.

[51] Int. Cl.⁵ .......................... B05D 1/06; B05D 3/12
[52] U.S. Cl. ........................................ 427/33; 427/104; 427/315
[58] Field of Search ...................... 427/29, 27, 33, 104, 427/315

[56] References Cited

U.S. PATENT DOCUMENTS

| | | | |
|---|---|---|---|
| 3,865,610 | 2/1975 | Goodridge et al. | 427/14.1 |
| 3,889,015 | 6/1975 | English | 427/14.1 |
| 3,901,185 | 8/1975 | Goodridge et al. | 118/630 |
| 3,904,346 | 9/1975 | Shaw et al. | 427/29 |
| 3,921,574 | 11/1975 | English | 118/106 |
| 4,391,016 | 7/1983 | Kawamura et al. | 15/302 |

*Primary Examiner*—Evan Lawrence
*Attorney, Agent, or Firm*—Ira S. Dorman

[57] ABSTRACT

The method utilizies steam to clean the exterior of laminated objects, preliminary to electrostatic powder coating, as well as to effect volatilization of liquid contaminates trapped between lamina thereof. Off-gassing that would otherwise occur when the objects are heated to effect fusion of the powder deposit is thereby avoided.

6 Claims, 4 Drawing Sheets

METHOD FOR STEAM CLEANING AND ELECTROSTATIC COATING OF LAMINATED ARTICLES

This is a divisional of copending application Ser. No. 07/493,791 filed on Mar. 15, 1990, U.S. Pat. No. 5,052,332.

BACKGROUND OF THE INVENTION

It is now common practice to coat workpieces by electrostatically depositing a layer of particulate resinous material upon them, thereafter integrating the particles using thermal fusion or other appropriate means. As shown for example in U.S. Pat. No. 3,865,610, issued Feb. 11, 1975, U.S. Pat. No. 3,889,015, issued Jun. 10, 1975, U.S. Pat. No. 3,901,185, issued Aug. 26, 1975, and U.S. Pat. No. 3,921,574, issued Nov. 25, 1975 (all of common assignment herewith), this technique has been utilized for insulating the slots and end surfaces of electric motor armature cores, and it is now widely used for that purpose on an industrial scale.

Armature cores are conventionally manufactured in the form of stacked lamina, punched or otherwise formed from metal plate. Lubricating substances are of course utilized in such metal cutting and forming operations, and as a practical matter some residual lubricant is almost invariably retained on the surfaces of the metal element, despite efforts made to remove it. The presence of such substances will interfere with the production of satisfactory insulating layers, and therefore a degreasing step is normally employed preliminarily to powder coating of the component, carried out in-line with the subsequent deposition and fusion steps.

As presently practiced however, degreasing does not effectively remove matter trapped between the lamina. As a result, residual lubricants and the like will volatilize during the heating that is carried out to effect fusion of the powder deposit, with the consequential off-gassing tending to produce pores and other electrical and physical defects and discontinuities.

It is of course common practice to use steam for removing grease and dirt from machinery, such as vehicle engines and the like. Also, Kawamura et al U.S. Pat. No. 4,391,016 discloses apparatus for degreasing elongated members, such as rod stock, which includes degreasing and predrying chambers; in the latter, steam is utilized to effect predrying.

Chlorinated and fluorinated hydrocarbon solvents, such as trichloroethylene and Freon products, are widely employed for metal degreasing, but such solvents are of course ecologically and environmentally undesirable; their use is therefore subject to serious constraints, imposed to maintain safe and pleasant working conditions and to ensure proper disposal. Because of their particularly noxious character, the vapors of such substances must not be permitted to escape into the atmosphere, and consequently they are normally used at relatively low temperatures, to avoid excessively active fuming, and are contained in tanks fitted with condensing coils for confining the vapors. As a result a relatively complex conveyor system must be employed to permit introduction of the workpieces at a level above the condensing coils, and passage therebelow for degreasing.

SUMMARY OF THE INVENTION

Accordingly, it is a broad object of the present invention to provide a novel system and method by which workpieces, and especially electrical components of laminated construction, can be cleaned and coated in a continuous, inline operation so as to enable the production of high quality, pore-free coatings thereupon.

A more specific object of the invention is to provide such a system and method in which lubricants, and other such substances, can be volatilized and thereby expelled from between adjacent lamina of a workpiece during the cleaning phase of operation.

Another more specific object is to provide such a system in which is included a conveyor, operating on a single level, for transporting the parts through the cleaning and coating zones.

Yet another specific object of the invention is to provide a highly effective and novel cleaning apparatus which is especially well suited for use in a system and method having the foregoing features and advantages.

DETAILED DESCRIPTION OF THE ILLUSTRATED EMBODIMENTS

Figure 1:
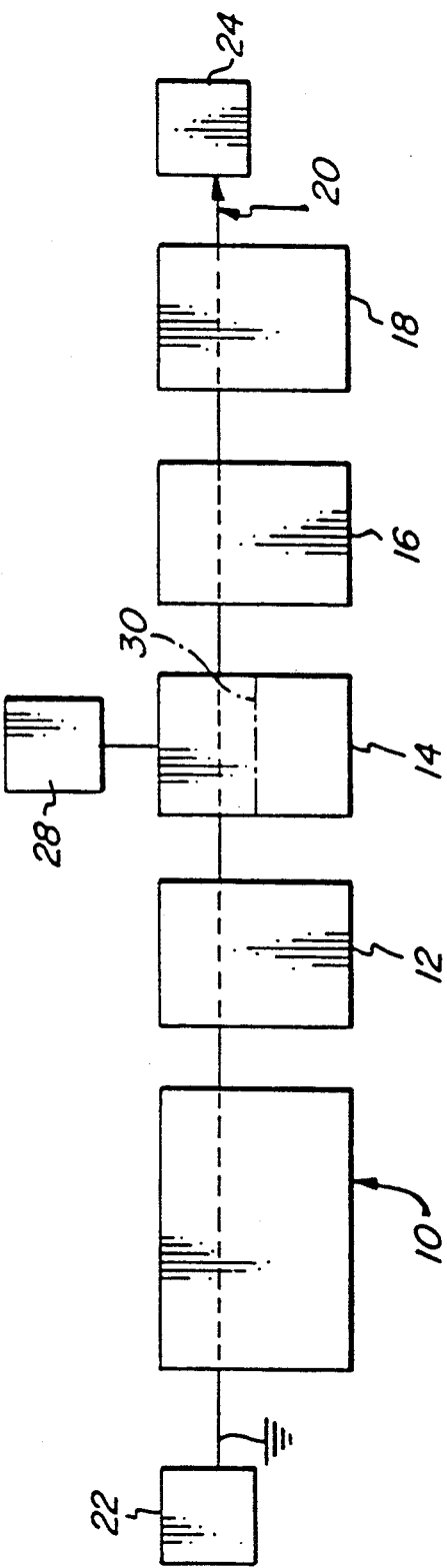
FIG. 1 is a schematic representation of a cleaning and coating system embodying the present invention.

Turning now in detail to FIG. 1 of the appended drawings, therein illustrated schematically is a cleaning and coating system embodying the present invention. It includes a degreasing unit, generally designated by the numeral 10, followed sequentially by a cooling unit 12, an electrostatic fluidized bed coating unit 14, a heating unit 16, and a second cooling unit 18. An electrically grounded conveyor mechanism, generally designated by the numeral 20 and having loading and unloading stations 22, 24 at its opposite ends, passes on a single level horizontally through each of the units 10, 12, 14, 16, and 18, to transport individual parts in the direction illustrated by the arrow in FIG. 1. A powder supply arrangement 28 is operatively connected to the coating unit 14, in which is disposed a porous support member 30, as is conventional.

Figure 2:
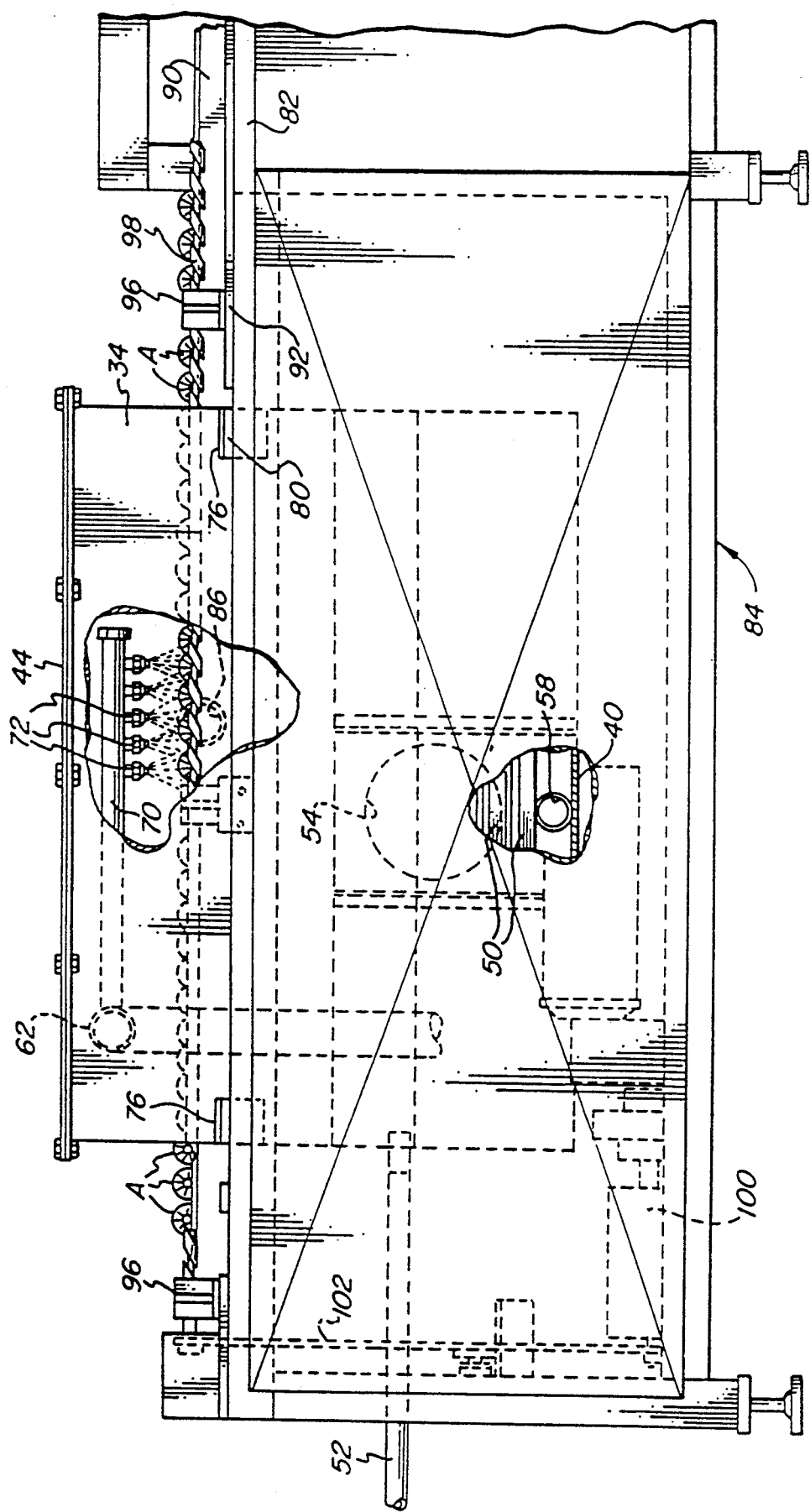
FIG. 2 is a fragmentary front elevational view of cleaning apparatus embodying the present invention and suitable for use in the system hereof, with housing portions broken away to expose internal features.
Figure 3:
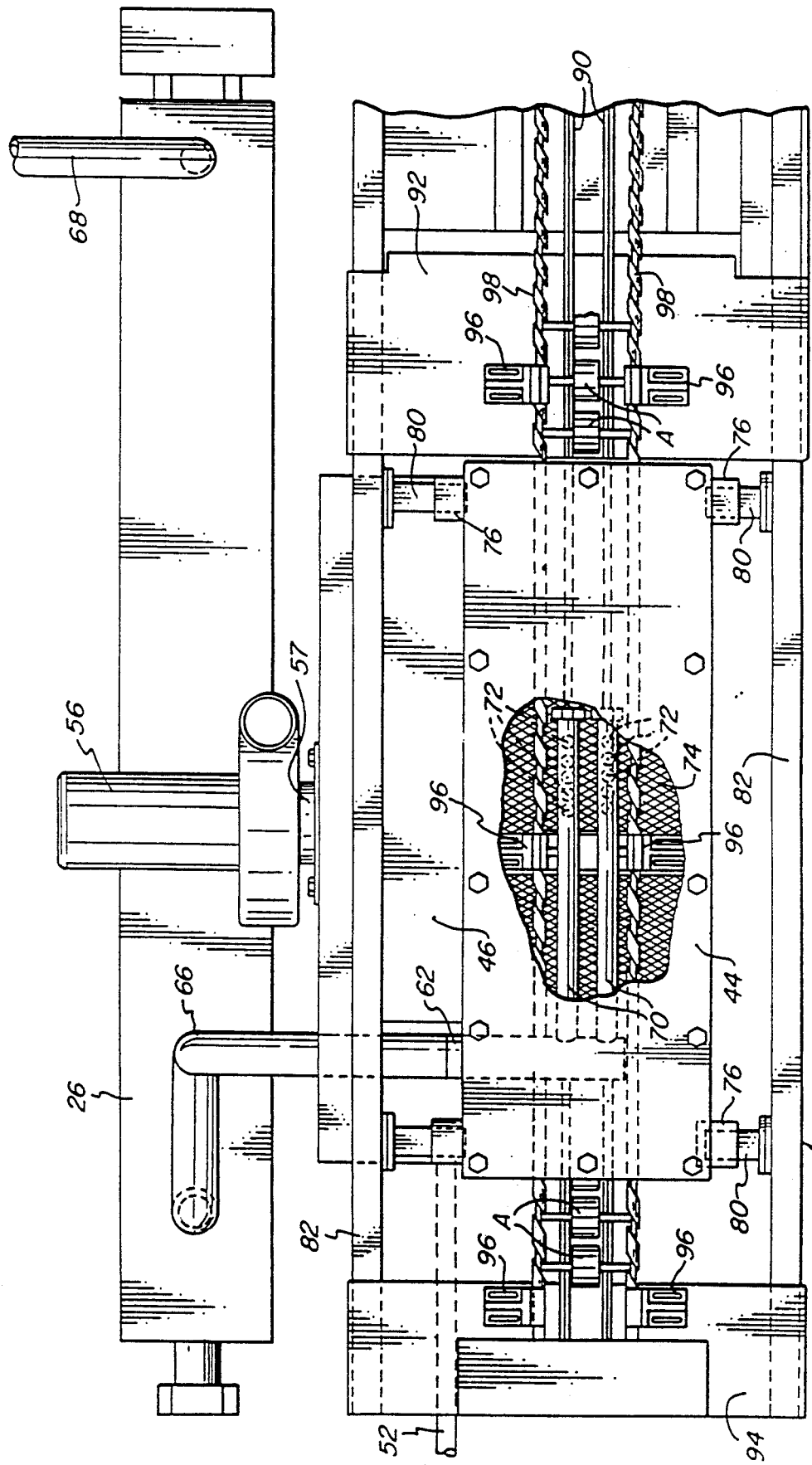
FIG. 3 is a fragmentary plan view of the apparatus of FIG. 2, with a cover portion broken away to expose internal features.
Figure 4:
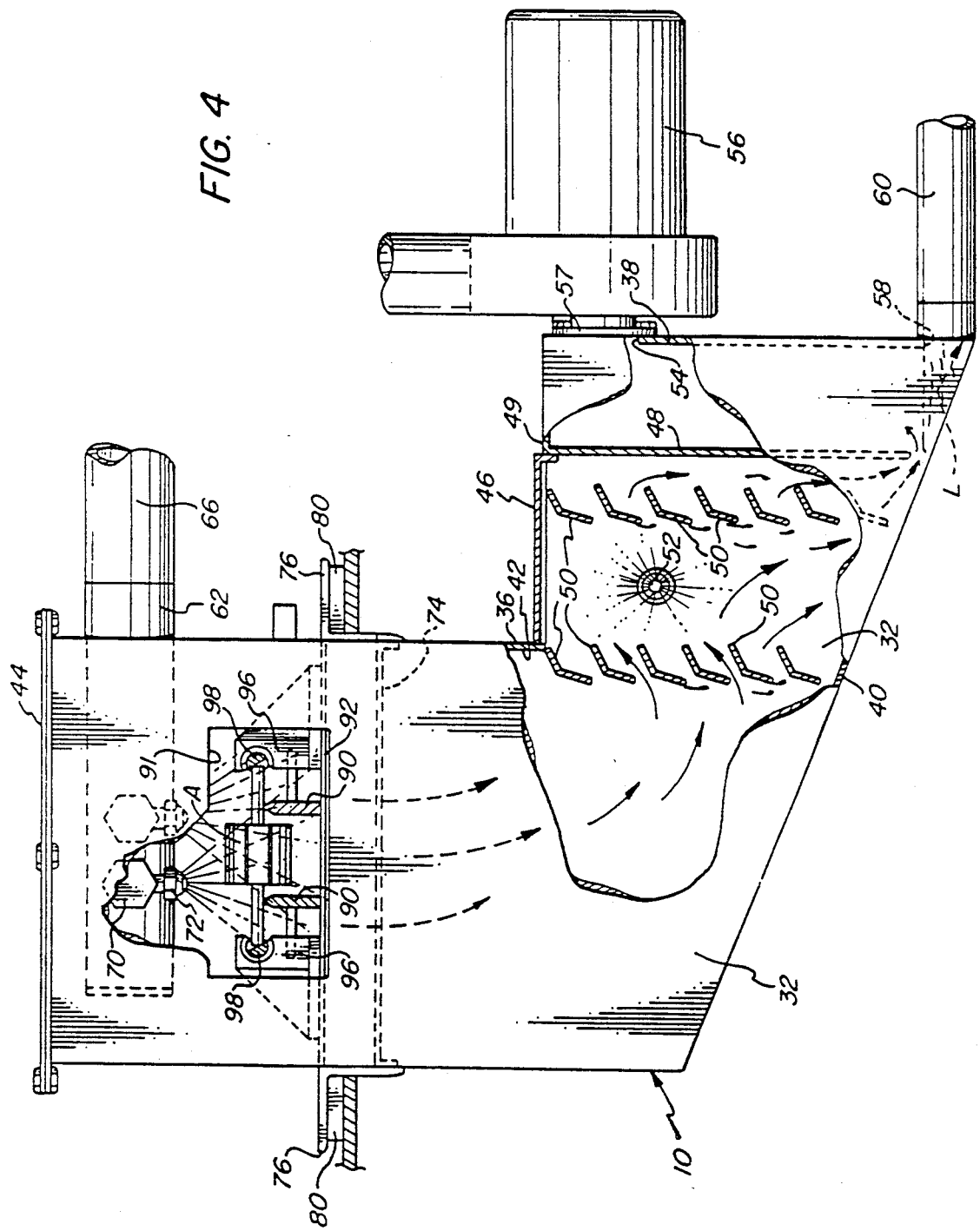
FIG. 4 is a fragmentary, right-end view of the apparatus of the foregoing figures, drawn to a somewhat enlarged scale and again having portions broken away to show internal features.

Turning now to FIGS. 2-4, it will be seen that the enclosure of the degreasing unit 10 consists of a pair of generally L-shaped end walls 32, a front wall 34, upper and lower rear walls 36 and 38, respectively, and an inclined bottom wall 40. The several walls cooperatively define an internal chamber 42, which includes a forward cleaning compartment and a collecting compartment rearwardly offset therefrom at a level generally therebelow. The forward compartment is closed by a cover 44, which is bolted in place, and the top of the collecting compartment is closed by a plate 46 that is set into an opening in the overlying upper wall 49.

Disposed near the rear of the collecting compartment is a depending partition 48, which is attached to the overlying wall 49 and extends to a point short of the bottom wall 40. Elongated baffle elements 50, arranged in two transversely spaced columns, span the sidewalls 32 in front of the partition 48, and a spray tube 52 extends through one of the end walls 32 into the space therebetween, cooperatively creating a condenser section within the collecting compartment. A relatively large opening 54 is formed through the upper portion of the rear wall 38, to provide communication with an electric exhaust fan 56 mounted by flange assembly 57, and an outlet port 58 is formed at the lower end of the rear wall 38, adjacent the bottom wall 40, to communicate with the drain pipe 60.

Extending through the upper rear wall 36 is a steam manifold 62, which is connected to the superheater 26 by conduit 66; a thermocouple (not shown) enables monitoring of the temperature therewithin. Inlet conduit 68 supplies saturated steam to the superheater 26, and two parallel pipes 70, each carrying a set of five downwardly directed nozzles 72, extend longitudinally within the chamber 42 from the manifold 62. Screen 74 spans the enclosure in a horizontal plane below the nozzles 72, and serves of course to prevent parts from dropping into the collecting compartment. A number of brackets 76 atached to the enclosure provide flange portions that extend forwardly and rearwardly from the walls 34 and 36, respectively, to support the unit 10 upon the upper beams 82 of the machine frame, generally designated by the numeral 84; heat-insulating pads 80 are interposed therebetween.

Two transversely spaced upstanding rails 90 extend parallel to one another along the top of the frame 84, passing through the aligned inlet and outlet openings 91 in the end walls 32 (only the outlet opening is visible). They rest upon the plates 92 and 94, which also support pairs of brackets 96, transversely aligned to opposite sides of the rails 90. The brackets 96 rotatably support parallel conveyor screws 98, which also extend through the openings 91 and cooperate with the rails to provide a length of the conveyor mechanism 20 depicted in FIG. 1, and an electric motor 100 is mounted within the lower portion of the frame 84; the motor is operatively connected to the screws 98 through a belt 102, as well as to other mechanisms of the system (by means not shown). Panel 104 (and other similar panels, not shown) is suitably attached to enclose the illustrated section of the frame.

In operation, the objects to be cleaned and coated, depicted herein as armatures, A, are initially loaded at station 22 onto the upstanding rails 90 with the opposite ends of their shafts engaged within the threads of the screws 98; they are grounded through the conveyor mechanism 20. The motor 100 serves of course to rotate the screws, causing them to carry the armatures forwardly through the enclosure of the cleaning unit 10, supported by the rails 90 and rotated by coaction therewith.

In the chamber 42 the armatures A will be subjected to high-pressure sprays of superheated steam, discharged from the nozzles 72. The steam will not only remove lubricant and other contamination (including dirt and metal fragments) from the exposed surfaces, but it will also heat the armatures to an elevated temperature, typically on the order of 700° F. At such temperatures the lubricants and other normally liquid contaminants will exist in the gaseous state; consequently, the steam will effect volatilization, expelling and flashing-off any liquids that may be present between the lamina of the cores.

After exiting the degreasing enclosure, the cleaned armatures A will pass in sequence through the cooling, coating, heating and cooling units, 12, 14, 16, and 18, respectively. In the course of doing so they will be electrostatically coated in a conventional manner, ultimately being off-loaded at location 24. Thus, after the armatures are cooled as necessary to prevent premature fusion, they are exposed to a cloud of electrostatically charged particles, which are attracted thereto so as to form a coating and are subsequently fused.

The contaminated steam from the upper portion of the forward chamber compartment will be drawn by exhaust fan 56 through the screen 74 and into the space between the columns of baffle elements 50. At that location a spray of water injected through the pipe 52 will effect condensation of any condensible fractions (e.g., of the steam, and of any contaminating substances) that may be present in the gaseous stream, with the resultant condensate liquid L passing under the internal partition 48, through the port 58, and into the drain pipe 60, to be discharged directly or conducted to a water treatment facility, as appropriate.

Any contaminating substance that is gaseous at the temperature to which the armatures are subjected to effect fusion of the coating powder deposited in the unit 14, will of course volatilize under those conditions. The resultant off-gassing will cause pore formation and other defects in the coating ultimately produced, leading to electrical and physical discontinuity and therefore to rejection of the part. As discussed above, the present invention obviates such problems. Moreover, the use of steam in the cleaning operation is highly beneficial from ecological and environmental standpoints; and by avoiding any need for dipping of the workpiece into a solvent vapor tank, the process enables the use of a relatively simple conveyor system, operating horizontally and in a single plane.

Thus, it can be seen that the present invention provides a novel system, method and apparatus by and with which workpieces, and especially electrical components of laminated construction, can be cleaned and coated in a continuous, in-line operation so as to enable the production of high quality, pore-free coatings thereupon. Metal-forming lubricants, and other substances that volatilize a elevated temperatures, will inherently be expelled from between adjacent lamina of a workpiece during the cleaning phase of operation, and the conveyor used for transporting the parts through the cleaning and coating zones can operate on a single level.

Having thus described the invention, what is claimed is:

1. A method for cleaning and coating a workpiece contaminated with a liquid lubricant or the like, comprising the steps:
   a. transporting a workpiece contaminated with a volatilizable liquid along a travel path, and carrying out the following steps during such transport;
   b. discharging steam upon said workpiece so as to remove such contamination therefrom and elevate the temperature of said workpiece;
   c. exposing said workpiece to a cloud of electrostatically charged particles with said workpiece at an electrical potential effective to attract particles of said cloud thereto, to form a coating thereupon;

d. cooling said workpiece between said steps b. and c., as necessary to prevent fusion of said particles of said coating during said step c; and e. effecting fusion of said particles of said coating on said workpiece subsequent to step c.

2. The method of claim 1 wherein said workpiece includes a portion that is of laminated metal construction, and wherein said contamination resides at least partially between the lamina thereof, said contamination comprising a substance that exists in the gaseous state at the temperature to which said object is elevated in said step c., said steam thereby being effective to volatilize and expel said substance from between the lamina.

3. The method of claim 2 wherein said workpiece is the armature of an electrical machine, said armature having a cylindrical core which provides said workpiece portion with shaft portions extending from the opposite ends of said core.

4. The method of claim 2 wherein said steam is superheated.

5. The method of claim 2 wherein said particles are of a thermoplastic material, and wherein said step e. is effected by heating of said workpiece.

6. The method of claim 1 wherein said travel path lies substantially entirely on a single horizontal plane.

* * * * *